A. DERROM.
Improvement in Softening Frozen Ground for Excavating.
No. 123,384. Patented Feb. 6, 1872.
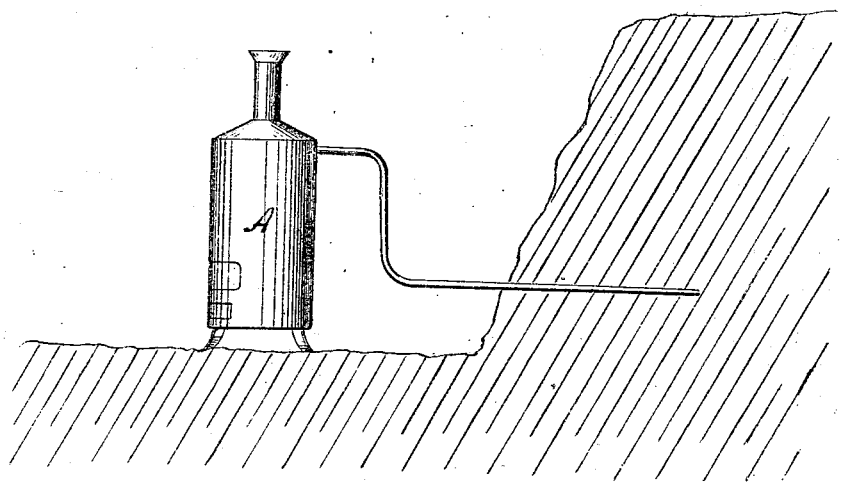

123,384

UNITED STATES PATENT OFFICE.

ANDREW DERROM, OF PATERSON, NEW JERSEY.

IMPROVEMENT IN SOFTENING FROZEN GROUND FOR EXCAVATING.

Specification forming part of Letters Patent No. 123,384, dated February 6, 1872.

Specification describing a new and Improved Method of Softening Frozen Ground, invented by ANDREW DERROM, of Paterson, in the county of Passaic and State of New Jersey.

The drawing represents a side view of an apparatus for softening frozen ground.

This invention has for its object to reduce the expense of digging the ground during the winter season for building or other purposes; and consists in the application of steam to frozen ground for the purpose stated. At present, with frozen ground, the digging in winter is much more expensive than in the warm season, and consequently the preparation for a commencement of building during the cold season is not generally undertaken on account of the greater expense. The hands are, therefore, mostly idle in winter. All this will be avoided and a flourishing trade continued throughout the year by the introduction of my inexpensive system of softening the frozen ground. I have ascertained that a small jet of steam applied under ground will take the frost out of a disproportionately large extent of earth, and have, therefore, resolved to practically utilize the discovery. The steam is applied under pressure from a boiler or steam-generator and is conveyed under the earth in a suitable pipe. As it is forced out of the pipe it interpenetrates the particles of earth, is condensed, and parts with its latent heat. The effect is to thaw an astonishing space of ground in proportion to the quantity of steam employed.

Having thus described my invention, I claim as new and desire to secure by Letters Patent—

The method of taking frost out of ground upon which a building is to be erected by forcing thereinto jets of steam, in the manner described.

ANDREW DERROM.

Witnesses:
   A. V. BRIESEN,
   T. B. MOSHER.